(12) United States Patent
Toth et al.

(10) Patent No.: US 6,791,290 B2
(45) Date of Patent: Sep. 14, 2004

(54) ELECTROHYDRAULIC CONVERTER

(75) Inventors: Tibor Toth, Frankfurt am Main (DE); Holger Wahl, Falkenweg 1 (DE); Josko Kurbasa, Waldsolms (DE); Jochen Beuss, Erzhausen (DE); Achim Netz, Seheim-Jugenheim (DE); Johannes-Dieter Nederstigt, Darmstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 67 days.

(21) Appl. No.: 10/258,263
(22) PCT Filed: Apr. 17, 2001
(86) PCT No.: PCT/EP01/04355
§ 371 (c)(1), (2), (4) Date: Oct. 22, 2002
(87) PCT Pub. No.: WO01/82454
PCT Pub. Date: Nov. 1, 2001

(65) Prior Publication Data
US 2003/0034746 A1 Feb. 20, 2003

(30) Foreign Application Priority Data
Apr. 22, 2000 (DE) .......................................... 100 19 993
Aug. 29, 2000 (DE) .......................................... 100 42 378

(51) Int. Cl.[7] ............................................. B60T 17/02
(52) U.S. Cl. ........................ 318/564; 318/245; 310/126; 310/140; 310/148
(58) Field of Search ................................. 318/564, 139, 318/244, 245, 248, 500; 310/101, 112, 126, 127, 136, 140, 148

(56) References Cited

U.S. PATENT DOCUMENTS 3,662,201 A * 5/1972 Madsen ...................... 310/220
4,426,611 A * 1/1984 Espelage et al. ............ 318/803
4,434,389 A * 2/1984 Langley et al. ............. 318/254
4,918,347 A * 4/1990 Takaba ....................... 310/179
5,261,501 A * 11/1993 Tsuchiya et al. ........... 180/412
5,704,766 A 1/1998 Fennel et al.
5,811,947 A 9/1998 Hurst et al.

FOREIGN PATENT DOCUMENTS

| DE | 88 11 964 | 7/1989 |
| DE | 4142993 | 7/1993 |
| DE | 44 26 309 | 2/1996 |
| DE | 198 40 944 | 3/2000 |
| EP | 0 543 419 | 5/1993 |
| EP | 0 842 070 | 5/1998 |
| JP | 52137621 | 11/1977 |
| JP | 58099280 | 6/1983 |

OTHER PUBLICATIONS

JP 08037771 A, In: Patent Abstracts of Japan, Date of Publication: Feb. 6, 1996, Applicant: Mitsubishi Electric Corp, Title: Linear–motor Elevator.

* cited by examiner

Primary Examiner—Bentsu Ro
(74) Attorney, Agent, or Firm—Honigman Miller Schwartz and Cohn LLP

(57) ABSTRACT

The present invention relates to a device in an electronic driving dynamics control system, comprising an electromechanic transducer, especially an electric motor, a hydraulic pump, and an electric actuating unit for the transducer, said transducer including a magnetic or magnetizable stator and a rotor, as well as connections for connecting the actuating unit, and a commutation device for the actuation of electromagnetic windings of the rotor, said invention inhering the special feature that the commutation device comprises three or more commutating elements that are electrically connected to the respective connections so that the windings of the rotor can be actuated individually by the actuating unit, with at least one commutating element being connected to a change-over element that provides for an additional connection for connecting a rotational speed measurement devices.

4 Claims, 1 Drawing Sheet

ELECTROHYDRAULIC CONVERTER

TECHNICAL FIELD

The present invention generally relates to electrohydraulic devices and more particularly relates to electrohydraulic devices used in electronic driving dynamics control systems.

BACKGROUND OF THE INVENTION

An increasing number of automotive vehicles are equipped with electronically controlled active braking devices and/or electronic systems for driving dynamics control such as ABS, ABS plus, TCS, or ESP. Besides electromagnetically controlled hydraulic valves, the mechanic part of the brake pressure controller also typically includes an electrically driven hydraulic pump for producing brake pressure.

DE-A-41 42 993 discloses an electric machine for converting electric and mechanic energy, which is appropriate for use as a pump motor for an anti-lock system. FIG. 1 illustrated therein shows a cross-sectional view of an electric motor adapted to be connected to a radial piston pump. The electric motor is operated by direct current and includes a commutator with two carbon brushes in addition to stator, rotor, armature windings, etc. A vibration damping element on the shaft of the rotor renders the operation to the pump reduced in noise.

Extreme demands in terms of power density, reliability, low cost, ease of servicing, and low noise levels are placed on electromagnetic transducers for anti-lock systems. Consequently, there is a continuing requirement for more efficient hydraulic pumps.

Particularly high demands are placed in terms of the continuous duty operation of a hydraulic pump and on electromagnetic transducers connected to the pump, especially as it relates to more recent electrohydraulic brake systems (EHB). Electromagnetic transducers do not provide the desired properties, or offer them to an insufficient degree only.

BRIEF SUMMARY OF THE INVENTION

Therefore, the present invention discloses a device which is improved with respect to the actuation of the pump motor compared to prior art hydraulic pumps.

The invention device in an electronic driving dynamics control system, comprising an electromechanic transducer, especially an electric motor, a hydraulic pump, and an electric actuating unit for the transducer, the said transducer including a magnetic or magnetizable stator and a rotor, as well as connections for connecting the actuating unit, and a commutation device for the actuation of electromagnetic windings of the rotor. The commutation device includes three or more commutating elements that are electrically connected to the respective connections so that the windings of the rotor can be actuated individually by the actuating unit, with at least one commutating element being connected to a change-over element that provides for an additional connection for coupling to a rotational speed measurement device.

The electronic driving dynamics control system may e.g. concern so-called ABS, ABSplus, TCS or ESP systems, in particular those systems being advantageously equipped with a device of the present invention which are used within an electrohydraulic brake system (EHB).

The transducer includes a magnetic or magnetizable stator and a rotor, as well as connections for connecting the actuating unit and a commutation device for the actuation of electromagnetic windings of the rotor. According to the present invention, the commutation device includes two or more commutating elements that are electrically connected to the respective connections so that the windings of the rotor can be actuated individually by the actuating unit. At least one of the commutating elements is connected to a change-over element according to this invention. This provides for an additional connection for connecting a rotational speed measurement device.

The commutation device according to the present invention permits the separate electric actuation of the windings in the rotor. It is possible to use this separate electric actuation feature to adjust the characteristic curve of the electromagnetic transducers in a simple fashion, e.g. electronically controlled, to the desired requirements. Noise reduction is achieved at a lower rate of rotational speed. However, the maximum rate of delivery may be achieved in full-load operation.

Starting current peaks may suitably be reduced by switching on of the motor only with the aid of one of the switch selected brushes.

The commutation device is e.g. an arrangement of carbons guided in cages and being pressed with spring elements against a contact in the area of the rotor shaft. Commutation devices for d-c motors with a corresponding design are per se known.

Preferably, the commutation device comprises four commutating elements for the actuation of other windings of the rotor. Not least for redundancy reasons even five or more commutating elements may be advisable to satisfy defined requirements for a more precise adaption of the characteristic curve of the motor.

Therefore, the present invention also relates to a system for controlling brakes in automotive vehicles with at least two redundant system elements (such as an electronic/hydraulic brake controller of double provision or partly provided components of brake controllers) which is characterized in that a first winding of the transducer of this invention is a component of a first system element, and another winding of the transducer is a component of another system element which is designed redundantly to the first system element. If, for example, a winding of the motor in the first system element fails, the other system element is able to actuate the additionally provided second winding.

The actuating unit may be a conventional voltage supply with at least four outputs in the simplest case.

Most favorably, the actuating unit comprises a clock generator for the pulsed and/or clocked actuation of the windings. This permits controlling the delivery rate of the pump with a particularly high resolution. An especially simple rotational speed control may be achieved by using a two-step action controller.

In a particularly advantageous manner, the change-over element and the speed measurement device are integrated into the actuating unit. This is a favorable economy of electronic components.

It is particularly favorable that the device of the present invention may be derived from generic devices known in the art by making modifications. Therefore, the invention concept permits being integrated in a particularly simple fashion into an existing large-scale production of anti-lock systems such as ABS, TCS, or ESP.

The device of the present invention will be explained in detail in the following by way of an embodiment illustrated in the accompanying drawing of a Figure.

DETAILED DESCRIPTION OF THE PREFERRED EMBODIMENTS

Figure 1:
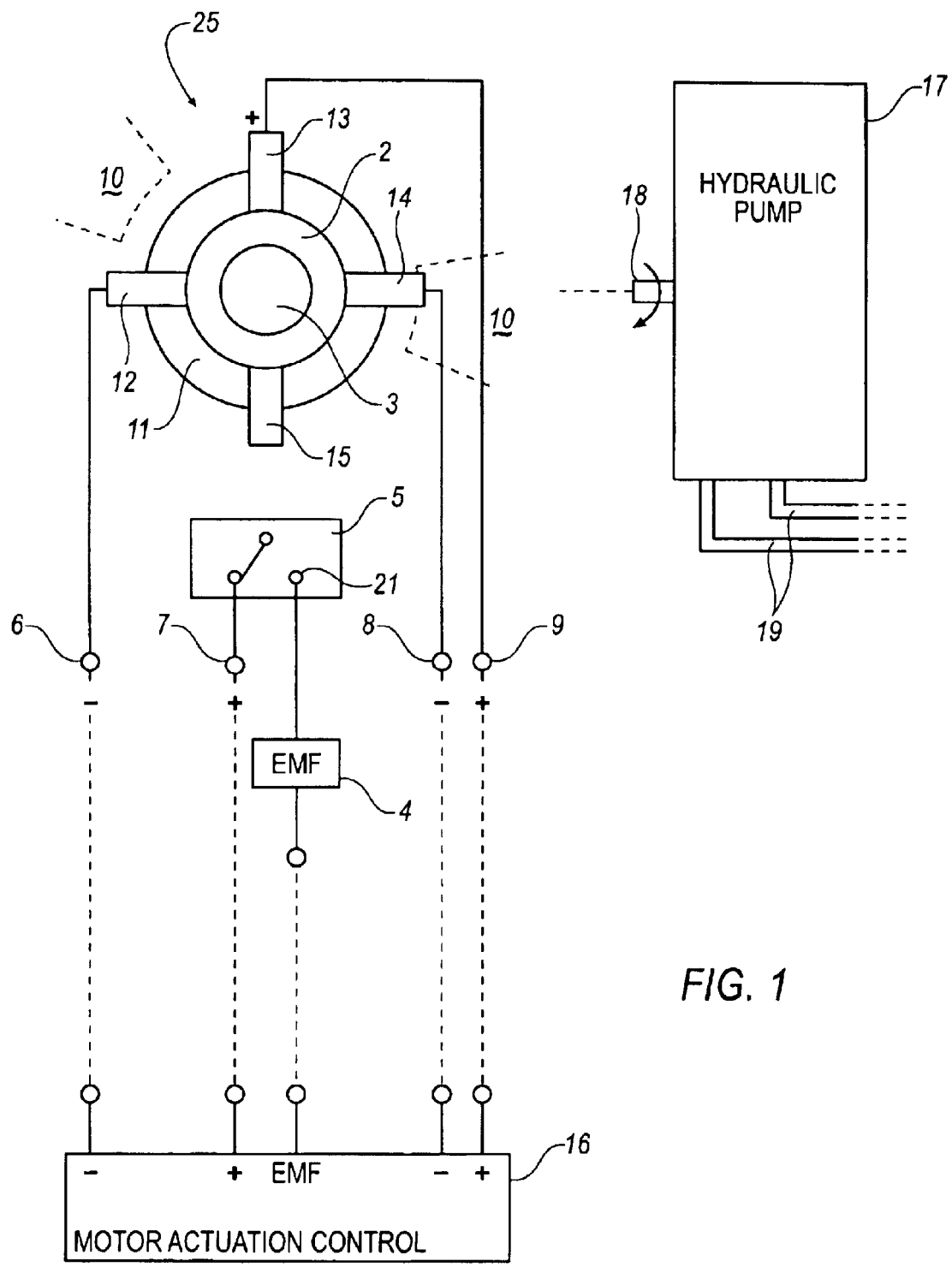
FIG. 1 is a schematic of the present invention coupled to a motor.

FIG. 1 shows a schematic view of an example for a device of the invention coupled to an electric motor 25 which, by way of a rotor shaft 3, is connected to the pump axis 18 of a hydraulic pump 17 that has hydraulic conduits 19.

The collector 2 with contact surfaces (not shown) is arranged to rotate on the cylindrical rotor shaft 3. Brushes 12, 13, 14, 15 that slide during the rotation of the rotor are in electric contact with said contact surfaces. Electromagnetic windings (not shown) are fitted to the rotor 11, magnetizing parts of the rotor in such a way that a torque in the direction of the rotor shaft 3 is produced in connection with rotor 10 from a magnet material in a known manner. The windings are connected to the contact surfaces of the collector 2 in such a fashion that practically in every position of the rotor two separate windings are connected by respectively two brushes to the electric motor actuation control 16 by way of terminals 6. 7, 8 and 9.

In the present example, one of the four brushes is connected to the motor actuation control 16 by way of an electronic switch that is used to activate or deactivate a winding. This allows a partial-load operation, with the winding switched off.

By way of connection 21 that is electrically connected to the brush 15 in the partial-load operation, the winding of the rotor not supplied with current may be used to measure the motor speed by way of the electromotive force (EMF), especially during motor operation. Connection 21 is connected to an EMF-evaluating circuit 4 to this end. The EMF evaluating circuit may be integrated into the motor actuation control 16.

The device for speed control in the actuating unit is favorably a per se known two-point controller, with the result of cost reduction in the actuation control that can be programmed by software.

List of Reference Numerals

12 commutating element
13 commutating element
14 commutating element
15 commutating element
2 collector
3 rotor shaft
4 rotational speed measurement device
5 change-over element
6 terminal
7 connection
8 connection
9 connection
10 stator
11 rotor
16 motor actuation control
17 pump
18 pump axis
19 hydraulic conduits
20 rotational speed measurement device
21 emf connection

What is claimed is:

1. Device in an electronic driving dynamics control system, comprising:

an electric motor, a hydraulic pump, and an electric actuating unit for controlling the electric motor, wherein the motor includes a magnetic or magnetizable stator and a rotor, as well as electrical connections for connecting the electric actuating unit to said electric motor, a commutation device for the actuation of electromagnetic windings of the electric motor rotor, wherein the commutation device includes three or more commutating elements that are electrically connected to respectively associated windings of the rotor, so that the rotor windings can be actuated individually by the electric actuating unit, wherein at least one commutating element is connected to a change-over element that provides for an additional connection to a rotational speed measurement device.

2. Device as claimed in claim 1, wherein the commutation device includes at least four commutating elements.

3. Device as claimed in claim 1 wherein the electric actuating unit comprises a clock generator for the pulsed or clocked actuation of the windings.

4. System for controlling brakes in automotive vehicles with at least two system elements of redundant design, comprising:

an electric motor having first and second windings, wherein said first winding is connected to a first motor actuation controller and said second winding is connected to a second motor actuation controller, wherein said first and second motor actuation controllers are of redundant designs.

* * * * *

UNITED STATES PATENT AND TRADEMARK OFFICE
CERTIFICATE OF CORRECTION

PATENT NO. : 6,791,290 B2
DATED : September 14, 2004
INVENTOR(S) : Toth et al.

It is certified that error appears in the above-identified patent and that said Letters Patent is hereby corrected as shown below:

Title page,
Item [57], ABSTRACT,
Line 48, change "speed measurement devices." to -- speed measurement device. --

Column 4,
Line 38, please change "claimed in claim 1 wherein" to -- claimed in claim 1, wherein --.

Signed and Sealed this

Twelfth Day of April, 2005

JON W. DUDAS
*Director of the United States Patent and Trademark Office*